Figure 1:
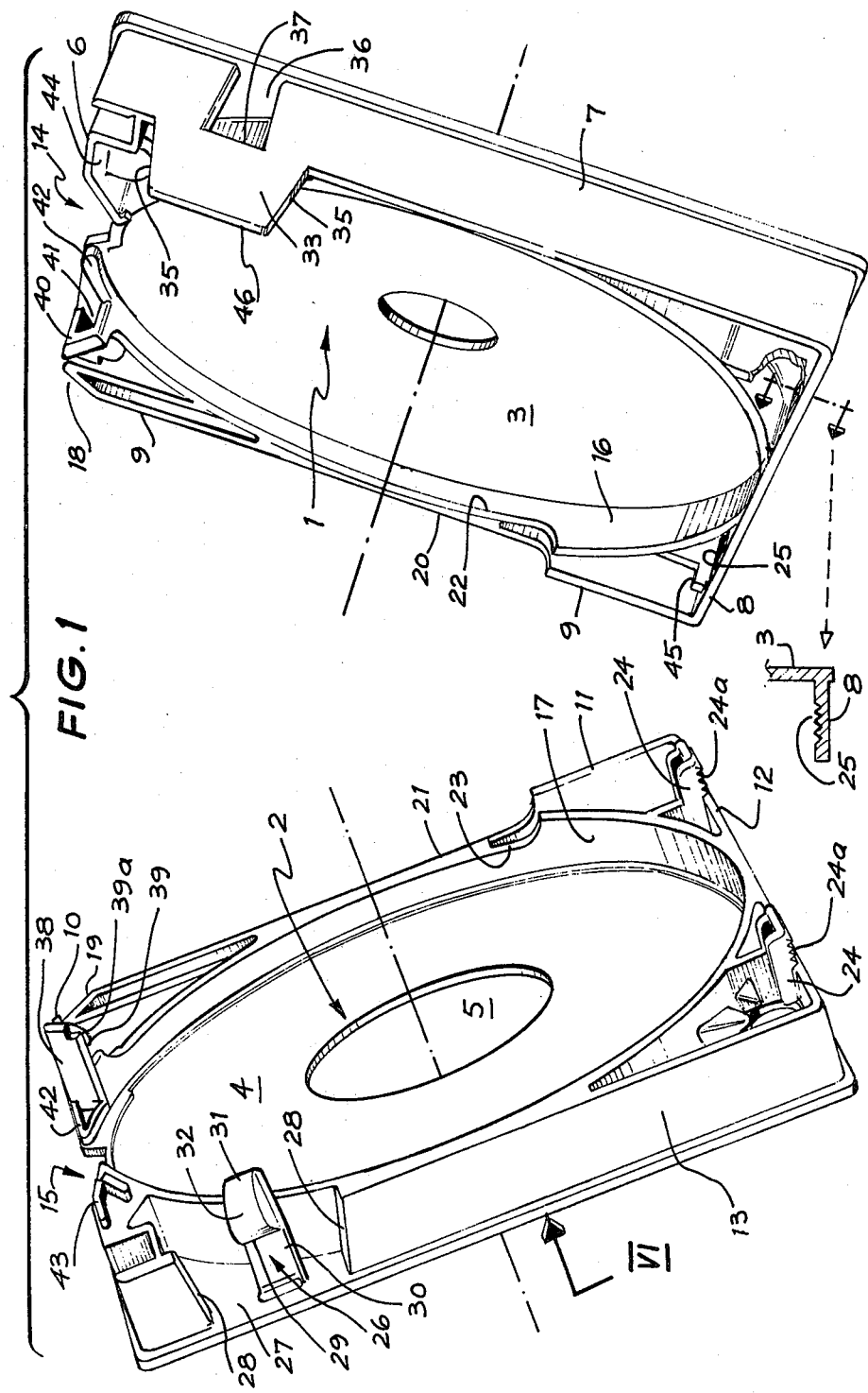

United States Patent [19]

Gell

[11] 4,294,418
[45] Oct. 13, 1981

[54] TAPE CARTRIDGE

[75] Inventor: Peter L. Gell, Redern, Australia

[73] Assignee: Tuscan Industries Pty. Limited, Redfern, Australia

[21] Appl. No.: 22,946

[22] Filed: Mar. 22, 1979

[30] Foreign Application Priority Data

Mar. 29, 1978 [AU] Australia .............................. PD3805

[51] Int. Cl.³ .......................... G03B 1/04; G11B 15/32
[52] U.S. Cl. .................................................. 242/197
[58] Field of Search ........................ 242/194, 197–200; 360/96, 132; 352/72, 78 R

[56] References Cited

U.S. PATENT DOCUMENTS

| | | | |
|---|---|---|---|
| 3,845,916 | 11/1974 | Livingston et al. | 242/197 |
| 3,858,829 | 1/1975 | Bradt et al. | 242/197 |
| 4,068,808 | 1/1978 | King | 242/118.7 |
| 4,156,511 | 5/1979 | Gell | 242/197 |

Primary Examiner—Leonard D. Christian
Attorney, Agent, or Firm—Emory L. Groff, Jr.

[57] ABSTRACT

A tape cartridge comprising two halves each comprised of a rectangular panel with a peripheral flange along three sides and portion of a fourth side to permit the panel adjacent the fourth side where the flange is not present to flex. Access openings in the flange at one of said three sides which lies adjacent the fourth side and said fourth side to provide access to the interior of the cartridge. A curved wall on the inner face of each panel, the walls having openings therein to align with the openings in the flange. Locating means to locate the cartridge halves one relative to the other in an assembling operation and releasable catch means to secure the halves together. The catch means being located at the fourth panel side and the panel side opposite the fourth side and the side which lies adjacent the fourth side but does not have the access opening.

5 Claims, 10 Drawing Figures

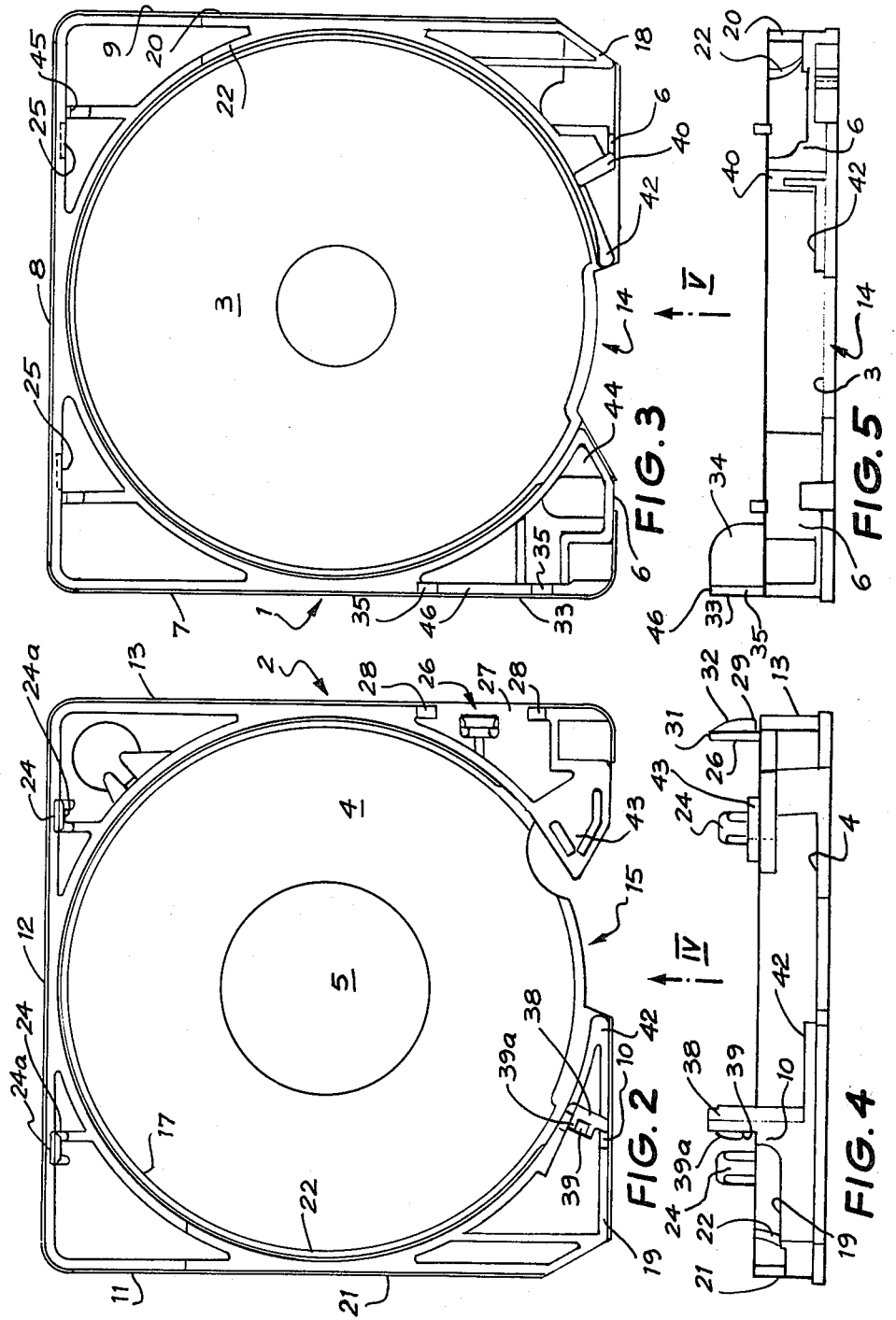

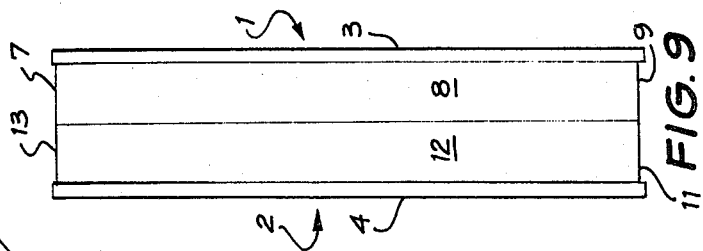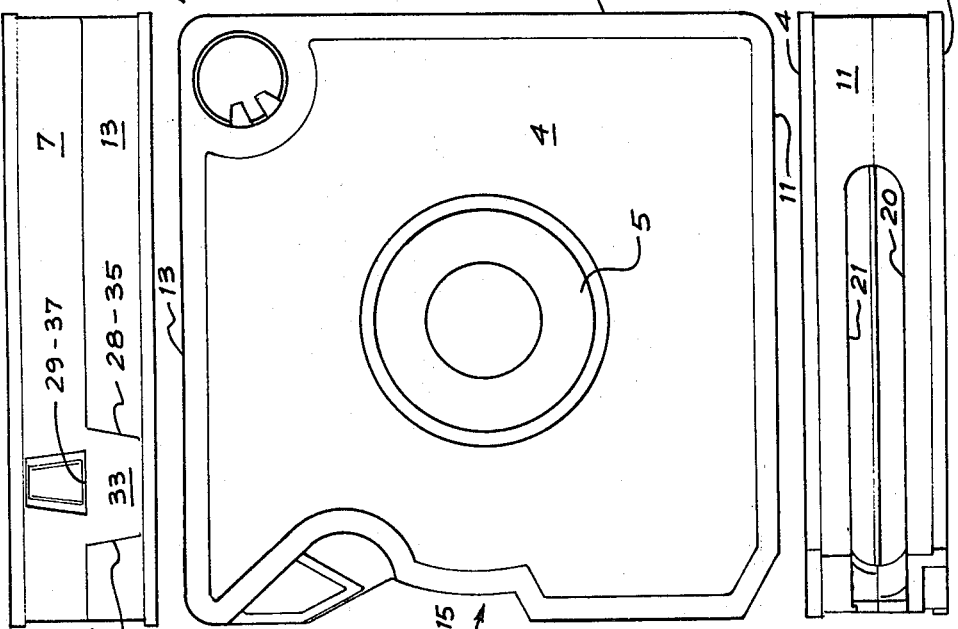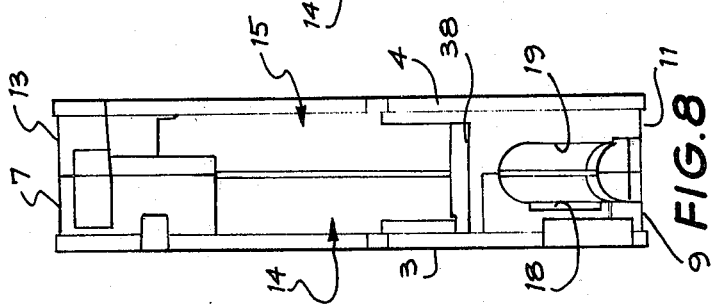

TAPE CARTRIDGE

This invention relates to a film cartridge, particularly suited for the storage and presentation of microfilm.

Hitherto it has been common to provide a rectangular film cartridge which comprised two complementary "halves" which when coupled together provided an enclosure for a spool. The spool was located and supported peripherally by wall means in the cartridge "halves". The cartridge had an opening in the periphery to allow film on the spool to be withdrawn from the cartridge. There was also an opening in one of the "halves" which gave access to the hub of the spool to enable it to be coupled to drive means for the spool. The "halves" were substantially permanently connected together to encapsulate the spool. The connection of the "halves" was by screws. Such a cartridge is disclosed in U.S. Pat. No. 3,150,840.

The replacement of a spool in a cartridge as described required the removal of the connection means. This, whilst appearing a simple operation, as only the use of a screwdriver was required, was a time consuming task for those persons required to replace spools.

In my U.S. Pat. No. 4,156,511 a cartridge construction is disclosed which overcame the above described disadvantages.

Whilst my cartridge is suitable for use in some known cartridge using machines it is not suitable for use in others. This invention provides an improvement in and a modification of the cartridge construction described and claimed in my aforementioned patent application which renders the film cartridge suitable for use in most machines now in operation and using a cartridge of this particular type.

In order that the cartridge can operate in a wider range of film using machines the cartridge is modified to provide additional peripheral openings and elements of the coupling means of the cartridge of my earlier patent application have to be redesigned and relocated.

The arrangement is still such that flexure of the panels to convex and concave can be achieved to permit the coupling means for the cartridge panels to be disengaged.

The nature of the invention will be readily understood from the following definition of a cartridge to house a rotatable tape spool, said cartridge comprising a first part and a second part, each part including a rectangular panel of resilient material with upstanding flanges at the first and fourth edges of the respective panels, alignment means to align corresponding flanges of the first and second parts and align coupling means to couple the first and second parts together to form a closed cartridge with an interior spool chamber to house a spool, a primary access opening comprising aligned gaps in corresponding first flanges at the first edges of the panels, a secondary access opening comprising aligned further gaps in said first flanges which further gaps provide extensions of aligned gaps in second flanges at second edges of said panels, arcuate upstanding walls on each panel to define said spool chamber and position said spool for rotation in the chamber, the upstanding arcuate walls and the flanges on the corresponding first, second, third and fourth edges of the panels substantially preventing flexure of the panel at those edges except in the panels adjacent the gaps of the primary access opening in the first flanges so as to permit flexure of the panels adjacent the gaps of the primary access opening, said releasable coupling means comprising complimentarily toothed upstanding lug means and surface means respectively at the third edges of the first and second panels which third edges lie opposite the first edges thereof, and rigid upstanding legs at the first edge of the panel having said lug means, the legs at the first edge being disposed between the flange gap of the primary access opening in the first flange and the flange gap of the secondary access opening in the second flange, and a rigid upstanding leg at the fourth edge of the panel having said lug means, the leg on the fourth edge lying adjacent the first panel edge, shoulder means on each of said legs, rigid upstanding tongues at the first and fourth edges of the panel not having the lug means, the tongue on the fourth edge engaging in a notch in the corresponding flange of the panel having the lug means so as to align the first and second parts, and apertures in the tongues engageable by the shoulder means of the legs to releasably secure the parts together, said shoulder means being engageable in said apertures as a result of flexure of the first edges of the panels adjacent the primary access opening to convex and concave configuration to make the legs convergent in a direction extending away from the panel having the legs and the tongues divergent in a direction extending away from the panel having the tongues, and an opening in one panel to permit driving engagement of driving means with a spool when housed in said chamber.

One embodiment of the invention is hereinafter described with reference to the accompanying drawings in which:

FIG. 1 is an exploded perspective view of the two parts of the cartridge of the present invention, FIG. 2 is a plan view looking at the interior of one part of the cartridge of FIG. 1, FIG. 3 is a plan view looking at the interior of the other part of the cartridge of FIG. 1, FIG. 4 is a view looking in the direction of arrow 4 of FIG. 2, FIG. 5 is a view looking in the direction of arrow 5 of FIG. 3, FIG. 6 is a side view of an assembled cartridge made up of the parts shown in FIG. 1 when viewed in the direction of arrow 6 of FIG. 1, FIG. 7 is a view looking in the direction of arrow 7 of FIG. 6, FIG. 8 is a view looking in the direction of arrow 8 of FIG. 6, FIG. 9 is a view looking in the direction of arrow 9 of FIG. 6, and FIG. 10 is a view looking in the direction of arrow 10 of FIG. 6.

Referring to the drawings, there are two cartridge parts 1 and 2, respectively including panels 3 and 4. The panel 4 has a central hole 5 to permit driving engagement of a driving means (not shown) with the hub of a spool in known manner when housed in the cartridge.

There are upstanding edge flanges 6, 7, 8 and 9 on part 1 and like flanges 10, 11, 12 and 13 on part 2. The flanges 6 and 10 have gaps 14 and 15 respectively to provide primary access opening means to a chamber in the cartridge when the parts 1 and 2 are assembled to form the cartridge. Upstanding arcuate walls 16 and 17 on parts 1 and 2 respectively define the chamber which is dimensioned to position a spool central with the opening 5 and at the same time peripherally support the spool during its rotation. The walls 16 and 17 also combine with flanges 7 to 9 and 11 to 13 respectively to prevent flexure of the panels 3 and 4 along the edges associated with those flanges whilst the gaps in the flanges 6 and 10 (where there is no wall 16 or 17) permit the panel first edges opposite gaps 14 and 15 to flex. The reasons for this will be described later.

A secondary access opening to the spool chamber is formed by gaps 18 and 19 in the flanges 6 and 10 adjacent the flanges 9 and 11. The gaps 18 and 19 combine with gaps 20 and 21 in the flanges 9 and 11 respectively to provide the exterior portion of the secondary access opening. The walls 16 and 17 have gaps 22 and 23 respectively to complete the second access opening. The rigidity of the panels 3 and 4 at the edges which have flanges 6 and 9, and 10 and 11 is maintained by the portions of these flanges remaining and the portion of the wall 16 and 17 remaining after the provision of the gaps 22 and 23.

The cartridge is made of plastic material having resilience so that if flexing pressure is applied to the cartridge parts to cause the panels 3 and 4 to flex (opposite the primary access opening) after the release of that pressure the panels will return to their normal straight condition.

The coupling means to releasably couple the parts together comprise two spaced apart upstanding legs 24 on the third flange 12 of part 2 with outwardly directed lateral teeth 24a. The legs 24 are ribbed to make them substantially rigid. On the inner surfaces of the flange 8 of the part 1 there are areas 25 having teeth of complimentary shape to the teeth 24a. The coupling means also includes a rigid upstanding leg 26 fixed to the panel 4 in line with a notch 27 in flange 13 and tied to the wall 17 by ribs. The notch 27 has sides 28 converging towards the panel 4. There is a shoulder 29 on leg 26 and the leg 26 is positioned so the outer surface of the body portion 30 thereof is aligned with the inner surface of the flange 13 and the leading edge 31 of the leg 26 is likewise aligned. The shoulder 29 is formed by a bulbuous portion 32 the purpose of which will be described later in the disclosure relating to the assembly of the parts 1 and 2 into a closed cartridge.

The flange 7 on part 1 has an upstanding fastening and locating tongue 33 with a rigidifying rib 34 and sloping sides 35 spaced apart to engage the sides 28 of notch 27 when the parts 1 and 2 are joined together to form a cartridge. The tongue 33 has an aperture 36 with an abutment edge 37 to snap under the shoulder 29 of the leg 26 as is later described.

In addition there is a leg 38 at the first edge of the panel 4 disposed between gaps 15 and 19 and the leg 38 has a projecting shoulder 39 with lead-up ramps 39a. On the panel 3 there is a leg 40 disposed between gaps 14 and 18 with an aperture 41 to receive the shoulder 39.

The teeth 24a by engaging with the teeth of areas 25 and the shoulders 29 and 39 by respectively engaging the abutment edge 37 and in the aperture 41 provide interlocking catch means to releasably secure the parts 1 and 2 together.

The gaps 14 and 15 combine to form the primary access opening for the spool chamber and lips 42 located in the mouth of the primary access opening centralised film as it passed through the primary access opening in an unrolling or in a rerolling operation of film stored on a spool housed within the cartridge.

As illustrated there is a raised ridge 43 on part 2 to locate in a recess 44 in part 1 and lug 45 adjacent flange 8 engages behind flange 12 to assist in the alignment of the parts 1 and 2 in the coupling operation.

The parts are preferably made in a moulding operation and various other ribs, apertures and openings are provided to enable the cartridge to be manufactured economically with minimum material, with strength and in such a manner as to enable the cartridge to be mounted in film or tape using equipment.

The method of engaging and disengaging the securing means of the parts includes flexure of a selected portion of the panels 3 and 4 of the parts 1 and 2 which lies opposite the primary access opening formed by gaps 14 and 15. Accordingly, a force is applied to urge the terminal end 46 on the tongue 33 and the terminal end 47 of the leg 40 apart, i.e., so as to be divergent away from the panel 3 with an accompanying curvature in the first edge of the panel 3 adjacent the primary access opening. Pressure applied to the panel 4 to cause it to curve adjacent the primary access opening will result in the legs 26 and 38 adopting a convergent relationship in the direction of the legs away from the panel 4. Assembly is thus achieved by engaging the teeth 24a with the tooth areas 25 and inserting the leading edge 31 of the leg 26 behind the terminal end 46 of the tongue 33 whilst at the same time engaging the ramp 39a behind the terminal end 47 of the leg 40, with the application of pressure will bring the two parts 1 and 2 together. In the action of coupling the first edges of the panels 3 and 4 will curve as outlined above as a result of the need to accommodate the difference in width between the bulbuous portion 32 and the shoulder 39 and the lesser distance between the inner surfaces of the tongue 33 and the leg 40. The curvature permits the bulbuous portion 32 of the leg 26 and the shoulder 39 on the leg 38 to slide over the inner surfaces on the tongue 33 and the leg 40 respectively until substantially simultaneously the edges 35 of the tongue 33 registers with the sides 28 of the notch 27, the shoulder 29 snaps under the abutment edge 37 of the tongue 33 and the shoulder 39 enters the aperture 41 of the leg 40.

Separating the parts is achieved by applying transverse flexing pressure to create the curvature described above in the first edges of the panels 3 and 4 with associated separating force causing the shoulder 29 to disengage from below the abutment edge 37 and the shoulder 39 to disengage from the aperture 41. Alternatively, if sufficient separating force is applied to the parts 1 and 2, without any transverse pressure, the flexure described above can be induced with the required disengagement of the shoulders 29 and 39 from the abutment edge 37 and the aperture 41 respectively.

I claim:

1. A cartridge to house a rotatable tape spool, said cartridge comprising a first part and a second part, each part including a rectangular panel of resilient material with upstanding flanges at the first and fourth edges of the respective panels, releasable coupling means on said first and second parts, alignment means to align corresponding flanges of the first and second parts and align said releasable coupling means to couple the first and second parts together to form a closed cartridge with an interior spool chamber to house a spool, a primary access opening comprising aligned gaps in corresponding first flanges at the first edges of the panels, a secondary access opening comprising aligned further gaps in said first flanges which further gaps provide extensions of aligned gaps in second flanges at second edges of said panels, arcuate upstanding walls on each panel to define said spool chamber and position said spool for rotation in the chamber, the upstanding arcuate walls and the flanges on the corresponding first, second, third and fourth edges of the panels substantially preventing flexure of the panel at those edges except in the panels adjacent the gaps of the primary access opening in the first flanges so as to permit flexure of the panels adjacent the gaps of the primary access opening, said releasable coupling means comprising complimentarily toothed upstanding lug means and surface means respectively at the third edges of the first and second panels which third edges lie opposite the first edges thereof, and a rigid upstanding first leg at the first edge of the panel having said lug means, the first leg at the first edge being disposed between the primary access opening and the secondary access opening in the second flange, and a rigid upstanding second leg at the fourth edge of the panel having said lug means, the second leg lying adjacent the first panel edge, shoulder means on the second leg, a rigid upstanding tongue at the fourth edge of the panel not having the lug means, the tongue engaging in a notch in the corresponding flange of the panel having the lug means so as to align the first and second parts, an aperture in the tongue engageable by the shoulder means of the second leg to releasably secure the parts together, said shoulder means being engageable in said aperture as a result of flexure of the first edges of the panels adjacent the primary access opening to convex and concave configuration to make the second leg lie inwardly of the flange of the fourth edge of the panel having the lugs and to make the tongue lie outwardly of the second leg, and an opening in one panel to permit driving engagement of driving means with a spool when housed in said chamber.

2. A cartridge as claimed in claim 1 including lips on the panels in said primary access opening to centralise the tape as it is unrolled from or rerolled onto a spool in the chamber.

3. A cartridge as claimed in claim 1 wherein said arcuate wall in each part comprises a single wall being the major part of a circumference of a circle, the arcuate walls being discontinuous opposite the primary access opening and having gaps which combine with the aligned gaps in the second flanges of the second edges of the panels and the further gaps in the first flanges at the first edges of the panel to form the secondary access opening to the spool chamber.

4. A cartridge as claimed in claim 1 wherein said tooth surface means is a toothed area on the inner surface of the flange of one part at the third edge thereof.

5. A cartridge as claimed in claim 2 wherein the tongue on the fourth panel edge has edges in the plane of its associated flange which tongue edges converge in a direction of the tongue away from its associated flange and the notch to receive the tongue edges has sides which diverge to form a socket to receive the convergent edges of the tongue.

* * * * *